United States Patent
Hagen et al.

(10) Patent No.: US 11,288,594 B2
(45) Date of Patent: Mar. 29, 2022

(54) DOMAIN CLASSIFICATION

(71) Applicant: Trend Micro Incorporated, Tokyo (JP)

(72) Inventors: Josiah Dede Hagen, Austin, TX (US); Prasad V. Rao, Princeton, NJ (US); Miranda Jane Felicity Mowbray, Bristol (GB)

(73) Assignee: Trend Micro Incorporated, Tokyo (JP)

( * ) Notice: Subject to any disclaimer, the term of this patent is extended or adjusted under 35 U.S.C. 154(b) by 1087 days.

(21) Appl. No.: 15/892,088

(22) Filed: Feb. 8, 2018

(65) Prior Publication Data

US 2018/0165607 A1   Jun. 14, 2018

Related U.S. Application Data

(63) Continuation of application No. PCT/US2015/047696, filed on Aug. 31, 2015.

(51) Int. Cl.
*G06N 20/00* (2019.01)
*H04L 9/40* (2022.01)
(Continued)

(52) U.S. Cl.
CPC ............ *G06N 20/00* (2019.01); *G06N 7/005* (2013.01); *H04L 29/06* (2013.01);
(Continued)

(58) Field of Classification Search
CPC ........ G06N 20/00; G06N 7/005; H04L 29/06; H04L 61/3025; H04L 63/1408; H04L 63/1416; H04L 61/6004
See application file for complete search history.

(56) References Cited

U.S. PATENT DOCUMENTS 6,266,664 B1 *   7/2001   Russell-Falla ...... G06F 16/9535
                                                              707/700
8,250,080 B1     8/2012   Guha et al.
(Continued)

FOREIGN PATENT DOCUMENTS

JP    2015-018487 A    1/2015

OTHER PUBLICATIONS

Tingwen Liu, Towards Fast and Optimal Grouping of Regular Expressions via DFA Size Estimation, IEEE, 2014 (Year: 2014).*
(Continued)

*Primary Examiner* — Joseph L Greene
(74) *Attorney, Agent, or Firm* — Patrick D. Benedicto

(57) ABSTRACT

In one example in accordance with the present disclosure, a method for domain classification includes sorting a set of sample domains into leaves based on syntactical features of the domains. Each sample domain belongs to a family of domains. The method also includes identifying, for each leaf, a regular expression for each family with at least one domain in the leaf. The method also includes determining, for each leaf, at least one lobe with a set of domains in the leaf that matches the regular expression for a first family with at least one domain in the leaf, and that does not match the regular expression for the other families with at least one domain in the leaf. The method also includes creating a classifier for the domains in each lobe by using the set of domains from each family in the lobe as training classes for machine learning.

14 Claims, 5 Drawing Sheets

(51) Int. Cl.
*H04L 29/06* (2006.01)
*G06N 7/00* (2006.01)
*H04L 61/3015* (2022.01)
*H04L 101/604* (2022.01)

(52) U.S. Cl.
CPC ...... *H04L 61/3025* (2013.01); *H04L 63/1408* (2013.01); *H04L 63/1416* (2013.01); *H04L 61/6004* (2013.01)

(56) References Cited

U.S. PATENT DOCUMENTS

| | | |
|---|---|---|
| 9,384,450 B1* | 7/2016 | Cordes ................. G06N 5/04 |
| 2002/0138649 A1* | 9/2002 | Cartmell ......... H04L 29/12594 |
| | | 709/245 |
| 2009/0113075 A1* | 4/2009 | Migault ............. H04L 61/1511 |
| | | 709/245 |
| 2009/0300768 A1 | 12/2009 | Krishnamurthy et al. |
| 2010/0312782 A1* | 12/2010 | Li ....................... G06F 16/9038 |
| | | 707/769 |
| 2011/0225181 A1 | 9/2011 | Kubicki et al. |
| 2014/0007238 A1* | 1/2014 | Magee ............... H04L 63/1408 |
| | | 726/24 |
| 2017/0206274 A1* | 7/2017 | Lefortier ............. G06F 16/951 |
| 2018/0332056 A1* | 11/2018 | Manadhata ......... H04L 61/1511 |

OTHER PUBLICATIONS

Fang Yu, Fast and Memory-Efficient Regular Expression Matching for Deep Packet Inspection, ANCS, 2006 (Year: 2006).*

* cited by examiner

DOMAIN CLASSIFICATION

CROSS-REFERENCE TO RELATED APPLICATION

This application is a continuation of International Application No. PCT/US2015/047696, with an International Filing Date of Aug. 31, 2015, which is incorporated herein by reference in its entirety.

BACKGROUND

Domain generating algorithms (DGAs) are often used by malware to generate large numbers of domain names for communicating with external sources. A computer infected by the malware can then attempt to communicate with some or all of the generated domains to receive commands. Because of the large number of domains, it may be difficult to shut down or otherwise prevent communication between an infected computer and each generated domain.

BRIEF DESCRIPTION OF THE DRAWINGS

The following detailed description references the drawings, wherein.

DETAILED DESCRIPTION

Figure 1:
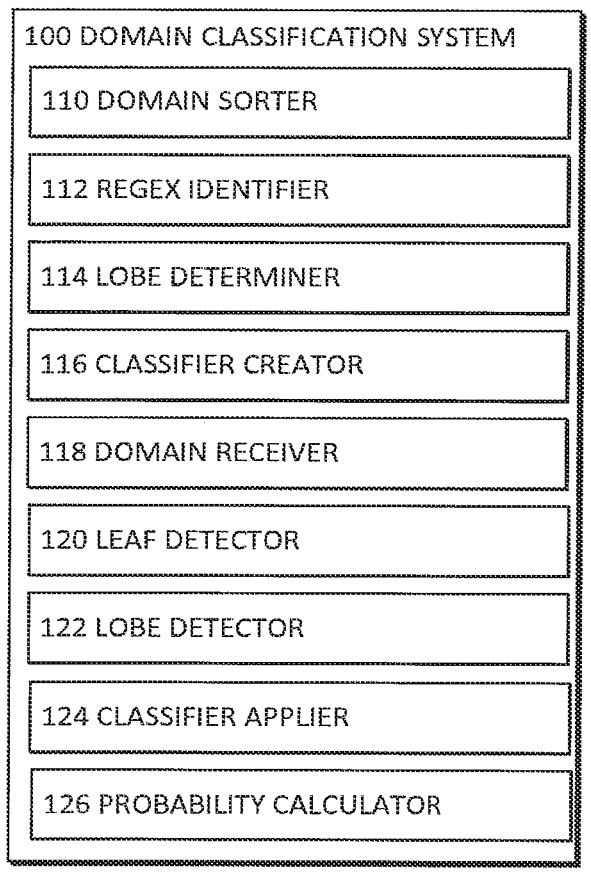
FIG. 1 is a block diagram of an example system for domain classification.

Example systems for domain classification use rules about the syntaxes of known DGAs and families of valid domains to determine what candidate DGA and/or valid families, or classes, a domain may be from. Machine learning may also be used to create statistical classifiers for domains matching that particular syntax. Once the classifiers have been created, the domain classification system may begin classifying unknown domains.

Traditional techniques that classify domains by a purely statistical approach may have quality limitations and produce large numbers of false positives. For example, classifiers may be created that clearly don't fit rules for known DGAs. Example domain classification systems discussed herein use two steps of rule determinations to build a 2 level hierarchy of rule-based syntactical classifiers, employing preprocessing rules in addition to machine learning techniques to improve classification. By incorporating rules with machine learning, example systems for domain classification can substantially reduce misclassifications and identify the salient features for a particular subset of domain-space and DGA-space. By applying computationally inexpensive pre-processing rules, the two-step process may be more efficient that traditional techniques. Moreover, pre-processing reduces the number of domains that more computationally expensive techniques must be applied to.

Analyzing DNS traffic, malware infected hosts can be identified based on queries made of algorithmically-generated domains. Example systems for domain classification use sample data from a number of known DGA families, both benign and malicious, as well as sample data from valid, non-DGA domains to build classifiers. A family, or class, of domains is a label in the labeled data set. Each family of domains may correspond to a known DGA. Domains in the same family may be produced by the same malware domain-generation algorithm, or may be benign domains with a particular characteristic (for example, domains connected with web services). The example systems further separate the domains into leaves and lobes. Each leaf may contain a set of families and each family may correspond to a regular expression. A given domain that matches the syntax for a leaf can match a subset (none, some or all) of the regular expressions for families in a leaf. A subset of regular expressions matched defines a lobe within a leaf.

An example method for domain classification may include sorting, by a processor, a set of sample domains into leaves based on syntactical features of the domains, wherein each sample domain belongs to a family of domains. The method may include identifying, for each leaf, a regular expression for each family with at least one domain in the leaf. The method may also include determining, for each leaf, at least one lobe with a set of domains in the leaf that matches the regular expression for a first family with at least one domain in the leaf, and that does not match the regular expression for the other families with at least one domain in the leaf. The method may also include creating, by the processor, a classifier for the domains in each lobe by using the set of domains from each family in the lobe as training classes for machine learning.

FIG. 1 is a block diagram of an example system 100 for domain classification. In the example shown in FIG. 1, system 100 may comprise various components, including a domain sorter 110, a regex identifier 112, a lobe determiner 114, a classifier creator 116, a domain receiver 118, a leaf detector 120, a lobe detector 122, a classifier applier 124, a probability calculator 126 and/or other components. According to various implementations, domain classification system 100 may be implemented in hardware and/or a combination of hardware and programming that configures hardware. Furthermore, in FIG. 1 and other Figures described herein, different numbers of components or entities than depicted may be used. As is illustrated with respect to FIG. 5, the hardware of the various components of domain classification system 100, for example, may include one or both of a processor and a machine-readable storage medium, while the instructions are code stored on the machine-readable storage medium and executable by the processor to perform the designated function.

Domain sorter 110 may sort a set of sample domains into leaves based on syntactical features of the domains. Each sample domain may belong to a family of domains. The sample domains may be a set of training domains used for creating classifiers. The syntactical features may be defined by a 4-tuple of: a top level domain, a length of a first private domain, a length of a prefix and a total number of levels below the top level domain.

Domain names have a structure that works from back to front, with levels separated by periods ("."). At the end of the domain name is a public suffix. This may have one or more levels (0 or more dots), and is sometimes referred to as the Top Level Domain (TLD). Example TLDs include "com", "net", "info", "co.uk". The level just below, or to the left of, the public suffix is the first private domain (sometimes referred to as a short second level domain). For example, if the sample domain is "abc123.def456.books.co.uk," the first private domain would be "books," with a length of 5.

Everything else below the first private domain is referred to as the prefix. In the example above, "abc123.def456" is the prefix, with a length of 13. There are 3 levels below the public suffix: "abc123", "def456", and "books".

As discussed above, domain sorter 110 may sort sample domains into leaves. For some DGA families, domains in the family only have one of a small number of different values of this 4-tuple, which may make the 4-tuple a good first level for sorting.

Domain sorter 110 may determine a value for each domain in a set of sample domains based on syntactical features of the domains and create at least one leaf of domains, wherein each domain in the leaf has the same value. Turning again to the example domain above, the values for 4-tuple may be: TLD="co.uk", Length of First private domain=5, Prefix length=13, Levels below public suffix=3. The TLD may be matched exactly so that only domains with the "co.uk" TLD are included. The first private domain length may be matched so that only domains with first private domain length 6 are included in the leaf. The length of everything before the second level domain may be matched so that only lengths of 12 are included in the leaf. The number of levels may be matched so that only domains with 3 levels below the top level domain are included in the leaf. In this manner, the 4-tuple specifies a "leaf," or group of domains.

Domains that match the 4-tuple may thus be grouped together in this leaf. A domain cannot match all 4 of these syntactic rules and also match the rules for another 4-tuple specified leaf. Therefore domains can only be in one leaf.

Regex identifier 112 may identify, for each leaf, a regular expression (regex) for each family with at least one domain in the leaf. The regular expressions may be determined prior to the training creation of leaves and lobes. The regular expressions may be determined from explicit rules obtained from analyzing the logic of a family's DGA or from statistical analysis of examples known to be of a family.

During training time it may be determined whether or not a sample domain matches each of the regular expressions for families compatible with at least one domain in the leaf. Each leaf may have domains from one or more families. Each family may have a regular expression that defines its syntax. The regular expression may codify domains within a leaf that are from a particular family. At least one domain may be classified as being benign.

Some examples of regular expressions for DGA families (malicious and benign) may include a regular expression for valid domains (benign) specified as "^.*$". This regular expression allows any characters between start and end. An example regular expression for a web service (benign) may be specified as "^_.*$". This regular expression begins with underscore ("_") as the first character followed by any characters. An example regular expression for domains in the Necurs family (malicious) may be specified as "^[a-y]+$". This regular expression contains characters "a-y" and does not include the character "z"). An example regular expression for domains in the Ramdo family (malicious) may be specified as "^[acegikmoqsuwy]+$" and may contain the odd indexed alphabetic characters. An example regular expression for domains in the NewGOZ family (malicious) may be specified as "^[a-z0-9]+$" and may include all alphanumeric characters.

Because the check for matches to regular expressions is done for domains whose leaf is already known (e.g., as discussed herein with respect to domain sorter 110), the top level domain, the length of a first private domain, the length of a prefix and the number of levels below the top level domain are already known. Accordingly, in some aspects these features may not be specified in the regular expressions. Moreover, although several example regular expressions are provided, the system for domain classification may use a variety of regular expressions.

Each domain may have a value (e.g., as discussed herein with respect to domain sorter 110) based on syntactical features of the domain, such as the 4-tuple discussed above. Each family may be determined by a possible value (such as a possible value for the 4-tuple) and each leaf consists of all domains with a particular value. The families in the leaf are those containing some domains with this value.

It is important to note that the regular expression for the "Valid" family admits anything. In the case that regex identifier 112 determines Valid as the only regular expression within a leaf, regex identifier 112 may further determine whether to classify the domain as Valid, or whether the domain is from an unknown family.

Lobe determiner 114 may determine for each leaf, at least one lobe with a set of domains in the leaf that matches the regular expression for a first family with at least one domain in the leaf, and that does not match the regular expression for the other families with at least one domain in the leaf. Lobe determiner 114 may also determine a lobe of possible combinations of the regular expressions and complements of regular expressions for each leaf. In other words, the lobe determiner may further separate the leaves into lobes. Each lobe represents a particular set of regular expressions and complements of regular expressions for the families of domains in the lobes.

Lobe determiner 114 may make a lobe for each possible combination of regular expressions and complements of regular expressions from the families in the leaf. For example, Leaf-1 may include domains from Family-1, Family-2, and Family-3 and Regex-1 may specify the regular expression for domains of Family-1, Regex-2 for Family-2 and Regex-3 for Family-3. Lobe determiner 114 may construct seven Lobes: Lobe A, Lobe B, Lobe C, Lobe D, Lobe E, Lobe F and Lobe G. Lobe-A may include domains in Leaf-1 satisfying Regex-1 and not Regex-2 nor Regex-3. Lobe-B may include domains in Leaf-1 satisfying Regex-2 and not Regex-1 nor Regex-3. Lobe-C may include domains in Leaf-1 satisfying Regex-3 and not Regex-1 nor Regex-2. Lobe-D may include domains in Leaf-1 satisfying Regex-1 and Regex-2 and not Regex-3. Lobe-E may include domains in Leaf-1 satisfying Regex-2 and Regex-3 and not Regex-1. Lobe-F may include domains in Leaf-1 satisfying Regex-1 and Regex-3 and not Regex2. Lobe-G may include domains in Leaf-1 satisfying Regex-1 and Regex-2 and Regex-3.

Accordingly, each regular expression may be or may not be included in a lobe, creating $2^n$ possible combinations for each leaf. Because a lobe can't include zero regular expressions (meaning that the domain matches none of the families syntaxes within the leaf), the empty lobe may not be included. This set of unions and complements may result in $2^n-1$ possible lobes for each leaf, where n is the number of families in the leaf. Identical lobes arising from different regex combinations may be identified by determining the union and intersection of the regular expressions.

Turning to the sample regular expressions discussed above with respect to regex identifier 112, if each of the specified families was in the same leaf, the lobe determiner 114 may consider the following set of families: Valid, Web Service, Necurs, Ramdo, NewGOZ. Unknown may also be included as a possible classification in the lobe as a "none of the above" classification, for cases where there is not enough training examples to create leaves and lobes, for cases where some novel syntax for a domain in live data which was not seen in training data, etc.

Accordingly, examples lobes created by lobe determiner 114 may include an "Only Valid" lobe specifying domains that do not start with "_" (i.e. because the domain is not a Web Service) and contains some other characters that none of the others lobes admit (e.g. "-"). Another example lobe may be a "Valid or Web Service" lobe specifying domains that start with "_". An example "Valid or NewGOZ" lobe may specify domains with no leading "_" and contain a digit or a "z". A "Valid or Necurs or NewGOZ" lobe may specify domains with no leading "_" and that contain some character forbidden by Ramdo. An example "Only Web Service" lobe may not exist because all domains matching the regular expression for Web Service also match the regular expression for Valid. Likewise Necurs, Ramdo and NewGOZ only lobes may not exist. A "Valid or Necurs" lobe may not exist because all domains matching the Valid or Necurs regular expressions also match the NewGOZ regular expression. Although 31 possible lobes existed in the proceeding example, only 5 lobes for this leaf remain after applying the set logic.

Classifier creator 116 may create a classifier for the domains in each lobe by using the set of domains from each family in the lobe as training classes for machine learning. The classifier may be a statistical classifier. The classifiers may be created from the syntactic features extracted from the training data domains in the lobe. Classifier creator 116 may create a hierarchy of classifiers. For example, the domains may be aggregated into superclasses such as benign and malicious to create classifiers for the malicious families and classifiers for the benign families. At least one family may be designated as one of a malicious family or a benign family. In this manner, the domain classification system uses a mix of rules that encode the gross syntax (public suffix, lengths and levels), the fine syntax (the set of regular expressions) and statistical elements of the syntax of the domains.

Once the classifiers have been created from the training data, the classifiers can be used to classify domains. Domain receiver 118 may receive a domain. The domain may be an unclassified domain and may not be a domain from training data. The leaf detector 120 may determine a leaf (e.g., as discussed herein with respect to domain sorter 110) that matches the unclassified domain. Lobe detector 122 may determine a lobe (e.g., as discussed herein with respect to lobe determiner 114) that matches the unclassified domain. Classifier applier 124 may apply the classifier (e.g., as discussed herein with respect to classifier creator 116) for the determined set to the unclassified domain. Probability calculator 126 may calculate a probability that an unclassified domain belongs to a family of domains. The probability may be represented as a numerical value (i.e. a percentage), a descriptor (i.e. highly likely, unlikely) or by other means.

Figure 2:
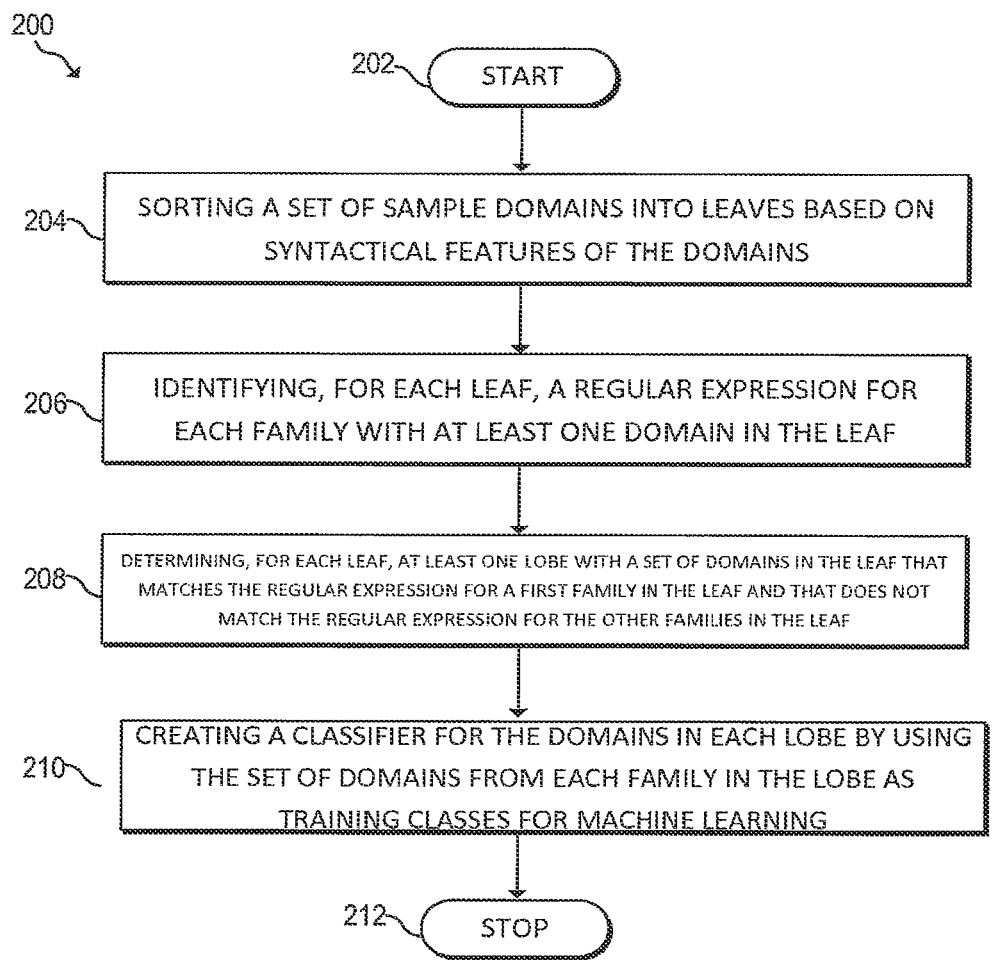
FIG. 2 is a flowchart of an example method for domain classification.

FIG. 2 is a flowchart of an example method 200 for domain classification. Method 200 may be described below as being executed or performed by a system, for example, system 100 of FIG. 1, system 400 of FIG. 4 or system 500 of FIG. 5. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate examples of the present disclosure, at least one step of method 200 may be executed substantially concurrently or in a different order than shown in FIG. 2. In alternate examples of the present disclosure, method 200 may include more or less steps than are shown in FIG. 2. In some examples, at least one of the steps of method 300 may, at certain times, be ongoing and/or may repeat.

Method 200 may start at step 202 and continue to step 204, where the method may include separating a set of sample domains into leaves based on syntactical features of the domains. The syntactical features may be defined by a 4-tuple of a top level domain, a length of a first private domain, a length of a prefix and a total number of levels below the top level domain. At step 206, the method may include determining, for each leaf, a regular expression for each family of domains in the leaf. The regular expressions may codify domains within a leaf that are from a particular family. At least one domain may be classified as having been generated by a known domain generation algorithm. At least one domain may be classified as being benign.

At step 208, the method may include determining a lobe of possible combinations of the regular expressions and a complement of regular expressions for each leaf. The method may further include determining a union and an intersection of the regular expressions. At step 210, the method may include creating a classifier for the domains in each lobe. Each classifier may correspond to a malicious family or a benign family. Method 200 may eventually continue to step 212, where method 200 may stop.

Figure 3:
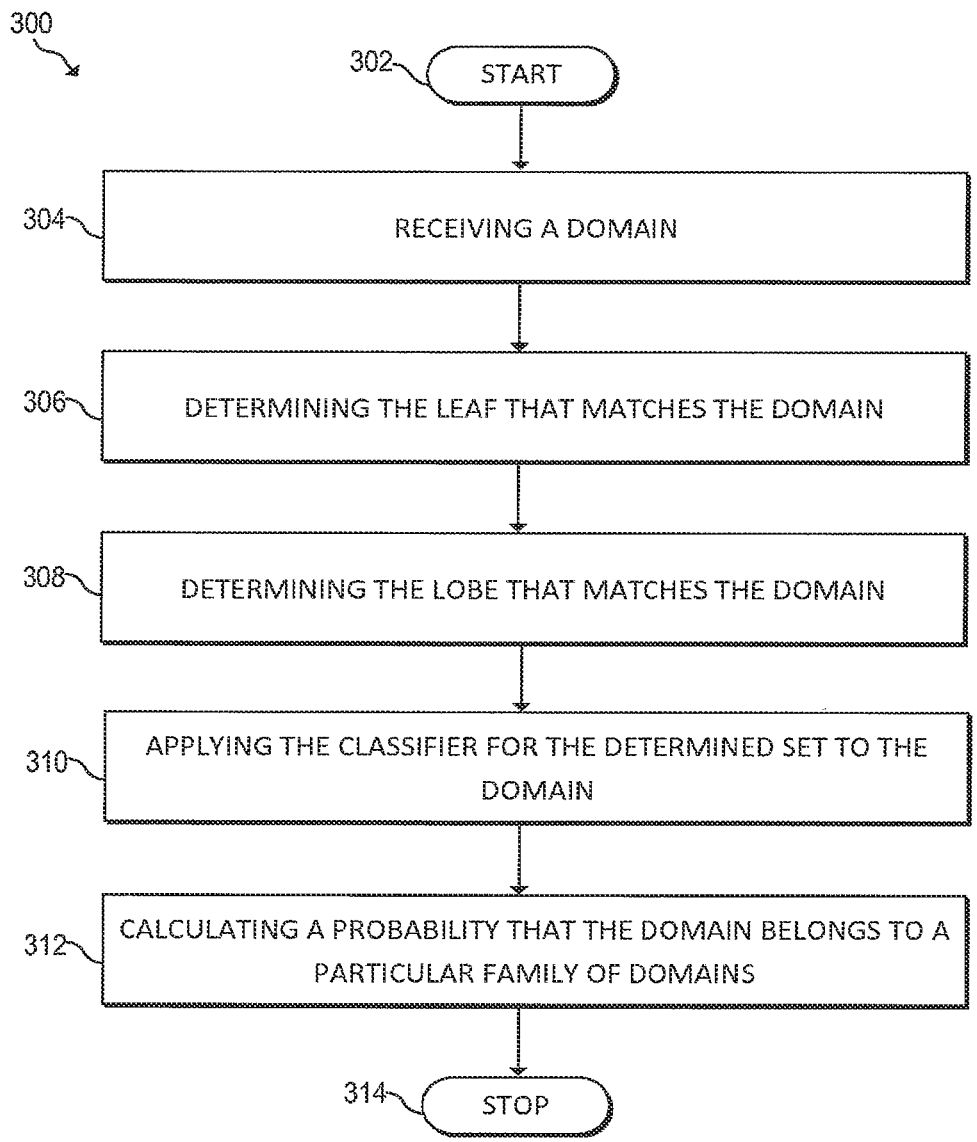
FIG. 3 is a flowchart of an example method for domain classification.

FIG. 3 is a flowchart of an example method 300 for domain classification. Method 300 may be described below as being executed or performed by a system, for example, system 100 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, at least one step of method 300 may be executed substantially concurrently or in a different order than shown in FIG. 3. In alternate examples of the present disclosure, method 300 may include more or less steps than are shown in FIG. 3. In some examples, at least one of the steps of method 300 may, at certain times, be ongoing and/or may repeat.

Method 300 may start at step 302 and continue to step 304, where the method may include receiving a domain. The domain may be unclassified. At step 306, the method may include determining the leaf that includes the domain. At step 308, the method may include determining the lobe that includes the domain. At step 310, the method may include applying the classifier for the determined lobe to the domain. At step 312, the method may include calculating a probability that the domain belongs to a particular family of domains. Method 300 may eventually continue to step 314, where method 300 may stop.

Figure 4:
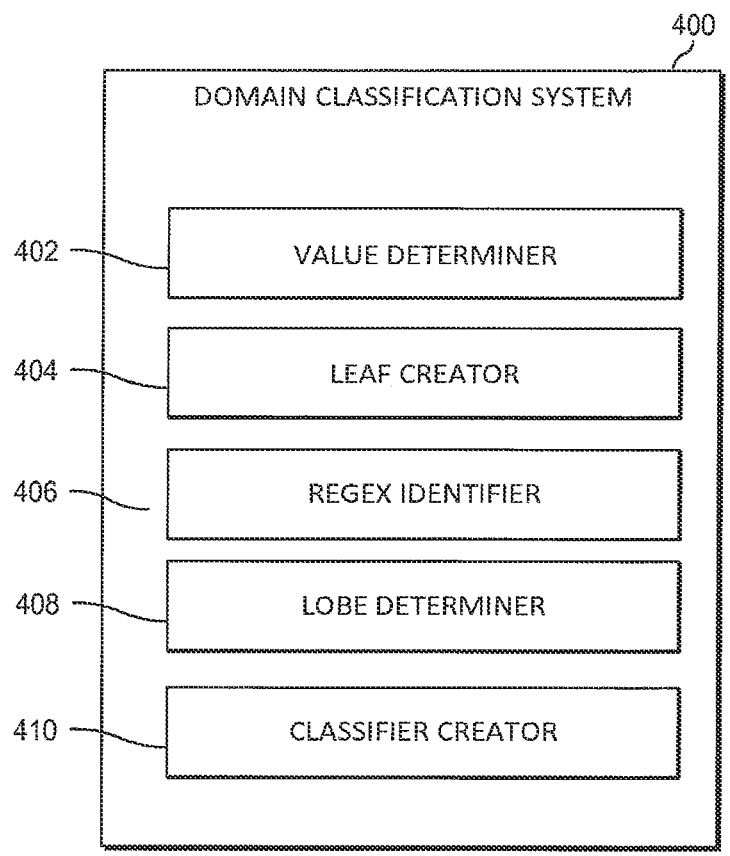
FIG. 4 is a block diagram of an example system for domain classification.

FIG. 4 is a block diagram of an example domain classification system 400. System 400 may be similar to system 100 of FIG. 1, for example. In FIG. 4, system 400 includes value determiner 402, leaf creator 404, regex identifier 406, lobe determiner 408 and classifier creator 410.

Value determiner 402 may determine a value for each domain in a set of sample domains based on syntactical features of the domains. The syntactical features may be defined by a 4-tuple of a top level domain, a length of a first private domain, a length of a prefix and a total number of levels below the top level domain. Value determiner 402 may be implemented in the form of executable instructions stored on at least one machine-readable storage medium of system 400 and executed by at least one processor of system 400. Alternatively or in addition, value determiner 402 may be implemented in the form of at least one hardware device including electronic circuitry for implementing the functionality of value determiner 402.

Leaf creator 404 may create at least one leaf of domains. Each domain in the leaf may have the same value, such as the same 4-tuple value. Leaf creator 404 may be implemented in the form of executable instructions stored on at least one machine-readable storage medium of system 400 and executed by at least one processor of system 400. Alternatively or in addition, leaf creator 404 may be implemented in the form of at least one hardware device including electronic circuitry for implementing the functionality of leaf creator 404.

Regex identifier 406 may identify, for each leaf, a regular expression for each family containing at least one domain in the leaf. Each domain in the leaf may have the same value. Each family may have a set of possible values, such as a 4-tuple value, and each leaf may consist of domains with values are possible for the families in the leaf. The regular expression may codify domains within a leaf that are from a particular family. At least one domain may be classified as having been generated by a known domain generation algorithm. At least one domain may be classified as being benign.

Regex identifier 406 may be implemented in the form of executable instructions stored on at least one machine-readable storage medium of system 400 and executed by at least one processor of system 400. Alternatively or in addition, regex identifier 406 may be implemented in the form of at least one hardware device including electronic circuitry for implementing the functionality of regex identifier 406.

Lobe determiner 408 may determine, for each leaf, at least one lobe of possible combinations of the regular expressions and a complement of regular expressions for families compatible with at least one domain in the leaf. A union and an intersection of the regular expressions may also be determined. Lobe determiner 408 may be implemented in the form of executable instructions stored on at least one machine-readable storage medium of system 400 and executed by at least one processor of system 400. Alternatively or in addition, lobe determiner 408 may be implemented in the form of at least one hardware device including electronic circuitry for implementing the functionality of lobe determiner 408.

Classifier creator 410 may create a classifier for the domains in each set in each lobe by using the set of domains from each family in the lobe as training classes for machine learning. At least one classifier may be designated as a malicious family or a benign family. Classifier creator 410 may be implemented in the form of executable instructions stored on at least one machine-readable storage medium of system 400 and executed by at least one processor of system 400. Alternatively or in addition, classifier creator 410 may be implemented in the form of at least one hardware device including electronic circuitry for implementing the functionality of classifier creator 410.

Figure 5:
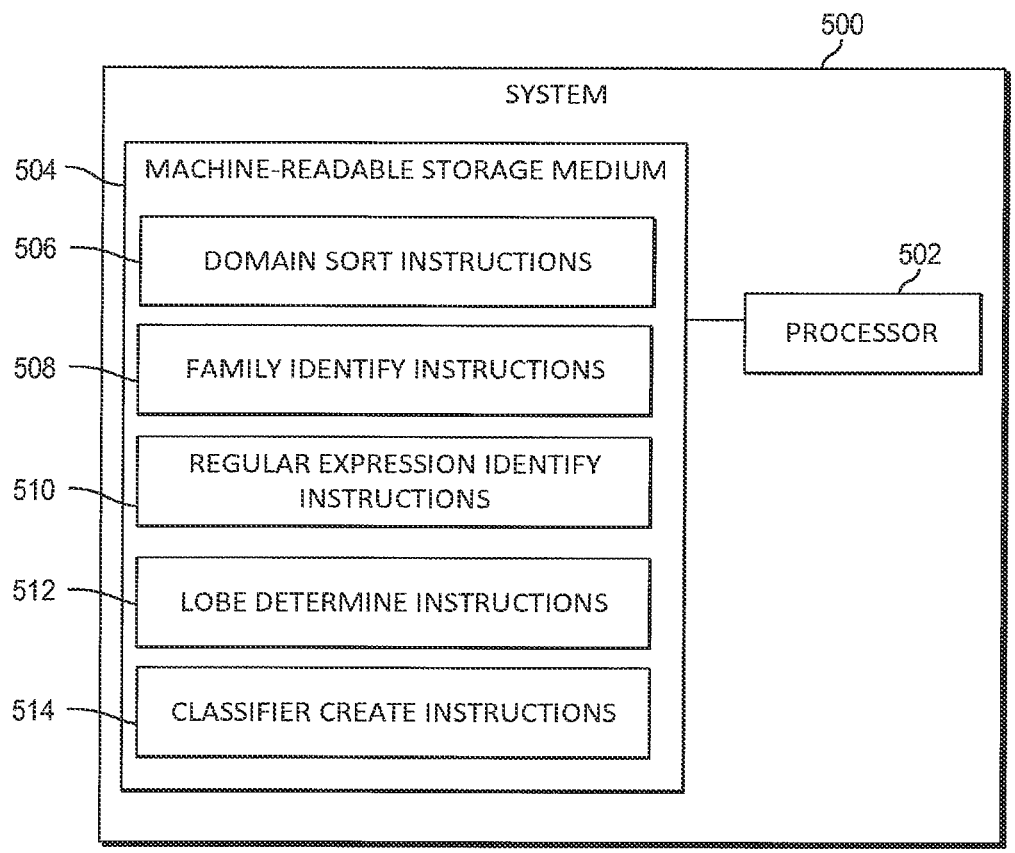
FIG. 5 is a block diagram of an example system for domain classification.

FIG. 5 is a block diagram of an example system 500 for domain classification. System 500 may be similar to system 100 of FIG. 1, for example. In the example illustrated in FIG. 5, system 500 includes a processor 502 and a machine-readable storage medium 504. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be one or more central processing units (CPUs), microprocessors, field programmable gate arrays (FPGAs) and/or other hardware devices suitable for retrieval and execution of instructions stored in machine-readable storage medium 504. In the example illustrated in FIG. 5, processor 502 may fetch, decode, and execute instructions 506, 508, 510, 512 and 514 to perform domain classification. As an alternative or in addition to retrieving and executing instructions, processor 502 may include one or more electronic circuits comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Alternatively, machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for domain classification.

Referring to FIG. 5, domain sort instructions 506, when executed by a processor (e.g., 502), may cause system 500 to sort a set of domains into leaves based on syntactical features of the domains. The syntactical features may be defined by a 4-tuple of a top level domain, a length of a first private domain, a length of a prefix and a total number of levels below the top level domain. Family identify instructions 508, when executed by a processor (e.g., 502), may cause system 500 to identify each family of domains in each leaf, wherein at least one family defines a set of domain generating algorithms. In some aspects, at least one family may define a set of domain generating algorithms.

Regular expression identify instructions 510, when executed by a processor (e.g., 502), may cause system 500 to identify a regular expression for each family. The regular expression may codify domains within a leaf that are from a particular family. At least one domain may be classified as having been generated by a known domain generation algorithm. Lobe determine instructions 512 may determine, for each leaf, at least one lobe of possible combinations of the regular expressions and a complement of the regular expressions for families compatible with at least one domain in the leaf. A union and an intersection of the regular expressions may also be determined. Classifier create instructions 514, when executed by a processor (e.g., 502), may cause system 500 to create a classifier for the domains in each lobe by using the set of domains from each family in the lobe as training classes for machine learning. Each classification may be designated as a malicious family or a benign family.

The foregoing disclosure describes a number of examples for domain classification. The disclosed examples may include systems, devices, computer-readable storage media, and methods for domain classification. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method for domain classification, the method comprising:
   sorting, by a processor, a set of sample domains into a plurality of leaves based on syntactical features of the sample domains, wherein each sample domain belongs to a family of domains;
   identifying, for each leaf of the plurality of leaves, a regular expression for each family of domains with at least one domain in the leaf;
   determining a plurality of lobes for each leaf of the plurality of leaves, at least one lobe of the plurality of lobes having a set of domains in the leaf that matches a regular expression for a first family of domains with at least one domain in the leaf, and that does not match a regular expression for other families of domains with at least one domain in the leaf;
   creating, by the processor, a classifier for each lobe of the plurality of lobes by using domains from each family of domains in the lobe as training classes for machine learning;
   receiving network traffic over a computer network; and
   analyzing the network traffic using a classifier for at least one lobe of the plurality of lobes to identify an algorithmically-generated domain employed by malware of an infected host on the computer network.

2. The method of claim 1, wherein the syntactical features are defined by a 4-tuple of a top level domain, a length of a first private domain, a length of a prefix and a total number of levels below the top level domain.

3. The method of claim 1, wherein, for each leaf of the plurality of leaves, a regular expression for each family of domains with at least one domain in the leaf codifies domains within the leaf that are from a particular family of domains.

4. The method of claim 1 further comprising:
   receiving, by the processor, an unclassified domain from the network traffic;
   determining, by the processor, a leaf that matches the unclassified domain;
   determining, by the processor, the at least one lobe that matches the unclassified domain; and
   applying, by the processor, the classifier for the at least one lobe to the unclassified domain.

5. The method of claim 1, further comprising:
   calculating, by the processor, a probability that an unclassified domain from the network traffic belongs to a family of domains used to train the classifier for the at least one lobe.

6. The method of claim 1, wherein at least one family of sample domains of the set of sample domains is designated as one of a malicious family or a benign family of domains.

7. The method of claim 1, wherein at least one domain from the network traffic is classified as being benign.

8. The method of claim 1, further comprising:
   determining for each leaf of the plurality of leaves, a union and an intersection of regular expressions of families of domains with at least one domain in the leaf.

9. A system for domain classification, the system comprising at least one processor and a memory, the memory storing instructions that when executed by the at least one processor cause the system to:
   determine a value for each domain in a set of sample domains based on syntactical features of the sample domains;
   create at least one leaf of domains, wherein all domains in the leaf have a same value;
   identify, for each leaf, a regular expression for each family of domains containing at least one domain in the leaf;
   determine, for each leaf, a plurality of lobes, at least one lobe of the plurality of lobes having of possible combinations of the regular expressions and a complement of regular expressions for families of domains compatible with at least one domain in the leaf; and
   create a classifier for each lobe of the plurality of lobes by using domains from each family of domains in the lobe as training classes for machine learning of the classifier to classify an unclassified domain as an algorithmically-generated domain used by a malware of an infected host on a computer network.

10. The system of claim 9, wherein each family of sample domains of the set of sample domains has a set of possible values and each leaf consists of domains with values that are possible for the domains in the leaf.

11. The system of claim 9, wherein the syntactical features are defined by a 4-tuple of a top level domain, a length of a first private domain, a length of a prefix and a total number of levels below the top level domain.

12. A non-transitory machine-readable storage medium comprising instructions executable by a processor of a computing device, the machine-readable storage medium comprising instructions to:
   sort a set of domains into a plurality of leaves based on syntactical features of the domains;
   identify each family of domains in each leaf, wherein at least one family of domains defines a set of domain generating algorithms;
   identify a regular expression for each family of domains in each leaf;
   determine, for each leaf, a plurality of lobes, at least one lobe of the plurality of lobes having regular expressions and a complement of the regular expressions for families of domains compatible with at least one domain in the leaf; and create a classifier for each lobe of the plurality of lobes by using domains from each family of domains in the lobe as training classes for machine learning of the classifier to classify an unclassified domain as an algorithmically-generated domain used by a malware on an infected host on a computer network.

13. The non-transitory machine-readable storage medium of claim 12, wherein the syntactical features are defined by a 4-tuple of a top level domain, a length of a first private domain, a length of a prefix and a total number of levels below the top level domain.

14. The non-transitory machine-readable storage medium of claim 12, further comprising instructions to:
   receive a test domain;
   determine a lobe of the plurality of lobes that matches the test domain; and
   apply a classifier for the determined lobe to the test domain.

* * * * *